US008565772B2

(12) United States Patent
Bae et al.

(10) Patent No.: US 8,565,772 B2
(45) Date of Patent: Oct. 22, 2013

(54) HANDOVER APPARATUS AND METHOD IN A HETEROGENEOUS WIRELESS COMMUNICATION SYSTEM

(75) Inventors: Eun-Hui Bae, Seoul (KR); Sung-Ho Choi, Suwon-si (KR); O-Sok Song, Suwon-si (KR); Tae-Sun Yeoum, Seoul (KR); Han-Na Lim, Siheung-si (KR); Jai-Yong Lee, Seoul (KR); Hyun-Duk Jung, Seoul (KR); Kyung-Min Kim, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 1113 days.

(21) Appl. No.: 12/053,825

(22) Filed: Mar. 24, 2008

(65) Prior Publication Data

US 2008/0291874 A1    Nov. 27, 2008

(30) Foreign Application Priority Data

Mar. 23, 2007   (KR) .................. 10-2007-0028913

(51) Int. Cl.
*H04W 36/00* (2009.01)
(52) U.S. Cl.
USPC ........... 455/439; 455/436; 455/448; 370/328; 370/331; 370/335
(58) Field of Classification Search
USPC ........... 455/436, 439, 448; 370/331, 328, 335
See application file for complete search history.

(56) References Cited

U.S. PATENT DOCUMENTS

| 5,682,380 | A  | * | 10/1997 | Park et al. ............... | 370/331 |
| 7,483,701 | B2 | * | 1/2009  | Jagadeesan et al. ...... | 455/436 |
| 7,640,036 | B2 | * | 12/2009 | Kallio .................... | 455/552.1 |
| 2001/0030953 | A1 | * | 10/2001 | Chang ................. | 370/331 |
| 2005/0266853 | A1 | * | 12/2005 | Gallagher et al. ........ | 455/439 |

(Continued)

FOREIGN PATENT DOCUMENTS

| KR | 100578305 | 5/2006 |
| KR | 1020060040412 | 5/2006 |

(Continued)

OTHER PUBLICATIONS

Kyungmin Kim, Voice Call Handover Scheme between 3G LTE and 3G CS Network, Yonsei University, Dec. 2007.

(Continued)

*Primary Examiner* — Nimesh Patel
(74) *Attorney, Agent, or Firm* — The Farrell Law Firm, P.C.

(57) ABSTRACT

Provided is a handover method, in which a call manager of a network having a Circuit Switching (CS) network, a Long Term Evolution (LTE) network, and an Internet Protocol Multimedia Subsystem (IMS) network, provides handover, from the LTE network to the CS network, to a terminal that uses one radio channel. The handover method includes upon receiving a request for handover from the terminal via a node of the LTE network, establishing a line to a Mobile Switching Center (MSC) of the CS network; sending, to the call manager, a request for a change in a session to another party's terminal in communication with the terminal, to establish an Internet Protocol (IP) bearer between the call manager and the other party's terminal; and sending a handover command to the terminal during the establishment of an IP bearer, to establish a radio channel to the base station of the CS network.

18 Claims, 9 Drawing Sheets

(56) References Cited

U.S. PATENT DOCUMENTS

| | | | |
|---|---|---|---|
| 2006/0024903 A1 | 2/2006 | Miller et al. | |
| 2006/0183478 A1 | 8/2006 | Jagadeesan et al. | |
| 2006/0246903 A1 | 11/2006 | Kong et al. | |
| 2007/0238468 A1 * | 10/2007 | Buckley et al. | 455/445 |

FOREIGN PATENT DOCUMENTS

| | | |
|---|---|---|
| WO | WO 2006/138736 | 12/2006 |
| WO | WO 2008/079080 | 7/2008 |
| WO | WO 2008/085373 | 7/2008 |

OTHER PUBLICATIONS

3rd Generation Partnership Project; Technical Specification Group Services and System Aspects; Voice Call Continuity (VCC) between Circuit Switched (CS) and IP Multimedia Subsystem (IMS), Stage 2, (Release 7), 3GPP TS 23.206 V7.2.0, 3GPP, Mar. 2007.

3rd Generation Partnership Project; Technical specification Group Services and System Aspects; Voice Call Continuity Between CS and IMS Study (Release 7) 3GPP TR 23.806 V7.0.0, Dec. 1, 2005.

Vodafone, "Single Radio Voice Call Continuity", S2-063159, 3GPP TSG SA WG2 Architecture, Aug. 22, 2006.

* cited by examiner

HANDOVER APPARATUS AND METHOD IN A HETEROGENEOUS WIRELESS COMMUNICATION SYSTEM

PRIORITY

This application claims the priority under 35 U.S.C. §119 (a) to a Korean Patent Application filed in the Korean Intellectual Property Office on Mar. 23, 2007 and assigned Serial No. 2007-28913, the disclosure of which is incorporated herein by reference.

BACKGROUND OF THE INVENTION

1. Field of the Invention

The present invention relates generally to a handover apparatus and method in a wireless communication system, and in particular, to a handover apparatus and method in a heterogeneous wireless communication system.

2. Description of the Related Art

Wireless communication systems have been developed to allow users to communicate, regardless of location. Such wireless communication systems are evolving from early systems that provide only simple voice communication services into advanced systems capable of providing high-speed data services, packet-based Voice-over-Internet Protocol (VoIP) services, etc.

Wireless communication systems are increasingly being developed, from Circuit Switching (CS) systems that provide basic voice services and lower-speed data services, into advanced systems that provide high-speed packet data services. Among the wireless communication systems, CS-based systems include the $2^{nd}$ Generation (2G) system and the $3^{rd}$ Generation (3G) system. The 3G system can provide higher-speed data services than the 2G system. However, due to a need for a system more advanced than the 2G or 3G systems in order to meet the increasing user demand for super high-speed data services, research and development is being conducted on the Long Term Evolution/Service Architecture Evolution (LTE/SAE) system.

The wireless communication systems provide services through a plurality of base stations since they should secure mobility of users. Therefore, handover from a particular base station to another base station may frequently occur while the users do not perceive the handover. For example, if a user receiving a service from a particular base station communicates while moving, the user will continuously receive the service from another base station during and after handover. The procedure for transferring the ongoing call from a particular base station to another base station regardless of movement of the user is called 'handover'. This handover technology is a very common technology in the wireless communication systems.

While the currently available wireless communication systems are 2G/3G-based systems, future available wireless communication systems will be LTE/SAE-based systems. Generally, all of the wireless systems cannot be replaced simultaneously, i.e., it is very difficult to replace all base stations and their upper layer nodes from the 2G/3G system to the LTE/SAE system.

Therefore, there is a possible case where the 2G/3G system and the LTE/SAE system may be used together. Even in this case, handover should be applied to all users in common, to remove inconveniences to users. However, the 2G/3G system provides the voice services using the CS scheme. The CS scheme assigns a fixed communication line between users desiring to make a voice call. That is, in the CS scheme, a voice signal is transmitted through a CS call. On the other hand, the LTE/SAE system is a network where all services use Packet Switching (PS) scheme. Therefore, the LTE/SAE system provides voice services based on VoIP using an IP Multimedia Subsystem (IMS).

In such cases where different systems coexist, the handover scheme from the LTE/SAE system to the CS system or from the CS system to the LTE/SAE system can be roughly classified into a scheme of performing handover so as to allow a user to receive signals from different networks using two radio channels, and a scheme of performing handover using only one radio channel. Both of the two schemes need a method for switching the existing call to another call in order to provide handover of a terminal in the system.

The two-radio channel based scheme should provide each terminal with its own associated radio channel elements, causing an increase in the cost of the terminal. From the standpoint of the terminal, the one-radio channel based scheme is more efficient than the two-radio channel based scheme. However, no method has been proposed yet in which a terminal using only one radio channel supports handover. Therefore, there is a demand for a method for performing handover to the CS system in a terminal that uses only one radio channel and is receiving a call from the LTE/SAE system.

SUMMARY OF THE INVENTION

An aspect of the present invention is to address at least the problems and/or disadvantages described above and to provide at least the advantages described below. Accordingly, an aspect of the present invention is to provide an apparatus and method for performing call handover between different systems.

Another aspect of the present invention is to provide an apparatus and method for, when a simultaneous access to an LTE system and a CS system is unavailable, performing a call handover.

Further another aspect of the present invention is to provide an apparatus and method for preventing a possible dropped call that may occur due to movement between different wireless communication systems.

According to one aspect of the present invention, there is provided a handover method between heterogeneous networks, in which a call manager of a network having a Circuit Switching (CS) network supporting a CS call, a Long Term Evolution (LTE) network supporting a packet call, and an Internet Protocol Multimedia Subsystem (IMS) network for anchoring a call, provides handover, from the LTE network to the CS network, to a terminal that uses one radio channel and can access the CS network and the LTE network. The handover method includes upon receiving a request for handover to a base station of the CS network from the terminal via a node of the LTE network, establishing a line to a Mobile Switching Center (MSC) of the CS network; sending, to the call manager, a request for a change in a session to another party's terminal in communication with the terminal, to establish an Internet Protocol (IP) bearer between the call manager and the other party's terminal; and during the establishment of an IP bearer, sending a handover command to the terminal, to establish a radio channel to the base station of the CS network.

According to another aspect of the present invention, there is provided a call manager apparatus for providing handover from a Long Term Evolution (LTE) network to a Circuit Switching (CS) network by a terminal in a network having the terminal that uses one radio channel and can access the CS network and the LTE network, the CS network supporting a CS call, the LTE network supporting a packet call, and an Internet Protocol Multimedia Subsystem (IMS) network for anchoring a call. The call manager apparatus includes a first interface for exchanging data and a first control signal with the CS network; a second interface for exchanging data and a second control signal with the LTE network; a third interface for exchanging data and a third control signal with the IMS network; and a controller adapted to establish a line to a Mobile Switching Center (MSC) of the CS network through the first interface upon receiving a request for handover to a base station of the CS network from the terminal through the second interface, adapted to establish an Internet Protocol (IP) bearer between the call manager and another party's terminal by sending a request for a change in a session to the other party's terminal to the call manager through the second interface, and adapted to establish a radio channel to the base station of the CS network by sending a handover command to the terminal through the first interface.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the accompanying drawings. In the following description, a detailed description of known functions and configurations incorporated herein has been omitted for clarity and conciseness. Terms used herein are defined based on functions in the present invention and may vary according to users, operators' intention or usual practices. Therefore, terms should be defined according to contents of the specification.

Before a description of the present invention is given, a description will be made of a process of connecting a traffic path and a control signal path between nodes for each of the case where a voice call is connected in a Long Term Evolution/Service Architecture Evolution (LTE/SAE) system and the case where a voice call is connected in a Circuit Switching (CS) system.

Figure 1:
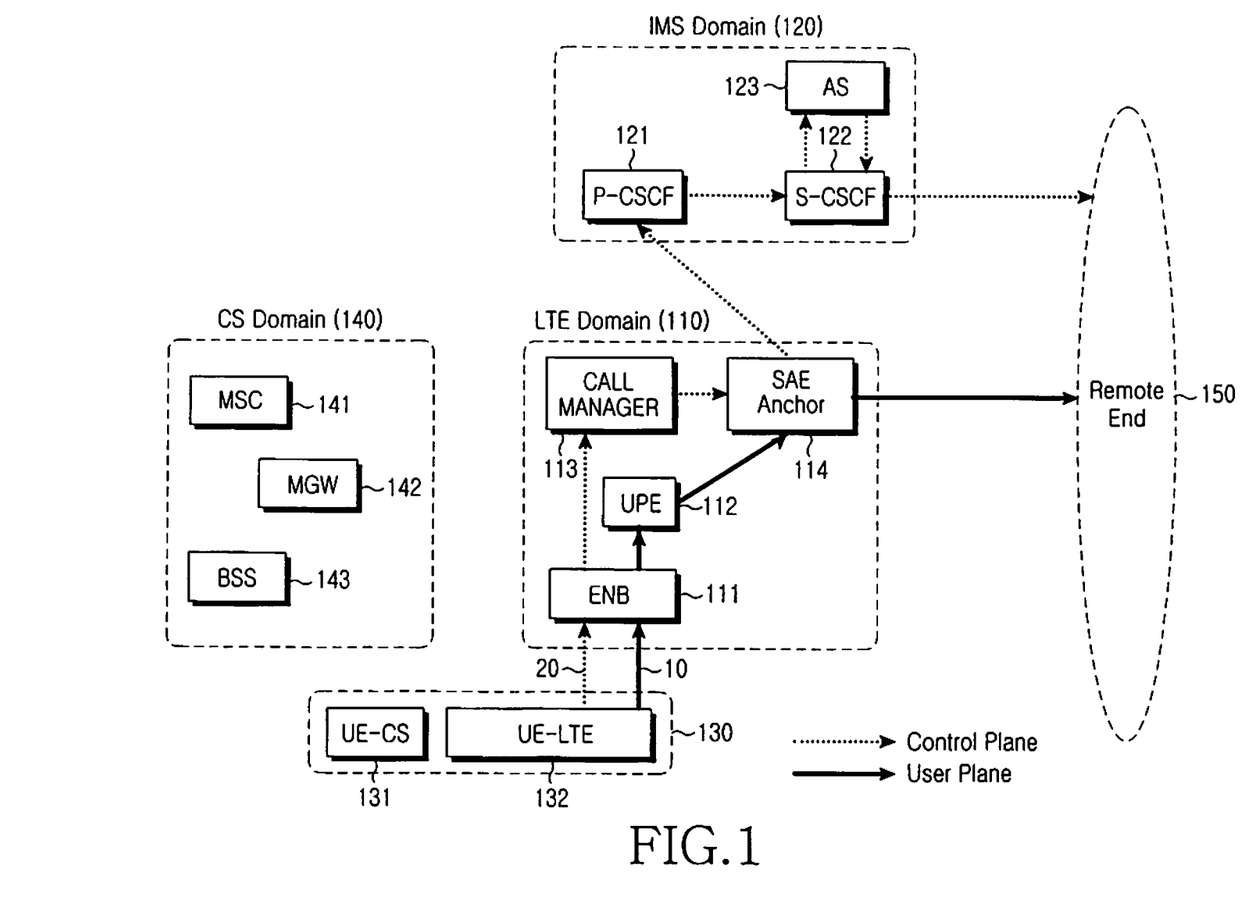
FIG. 1 is a conceptual diagram illustrating a combined configuration of a CS system and nodes necessary for a case where a voice call is connected in an LTE/SAE system.
Figure 2:
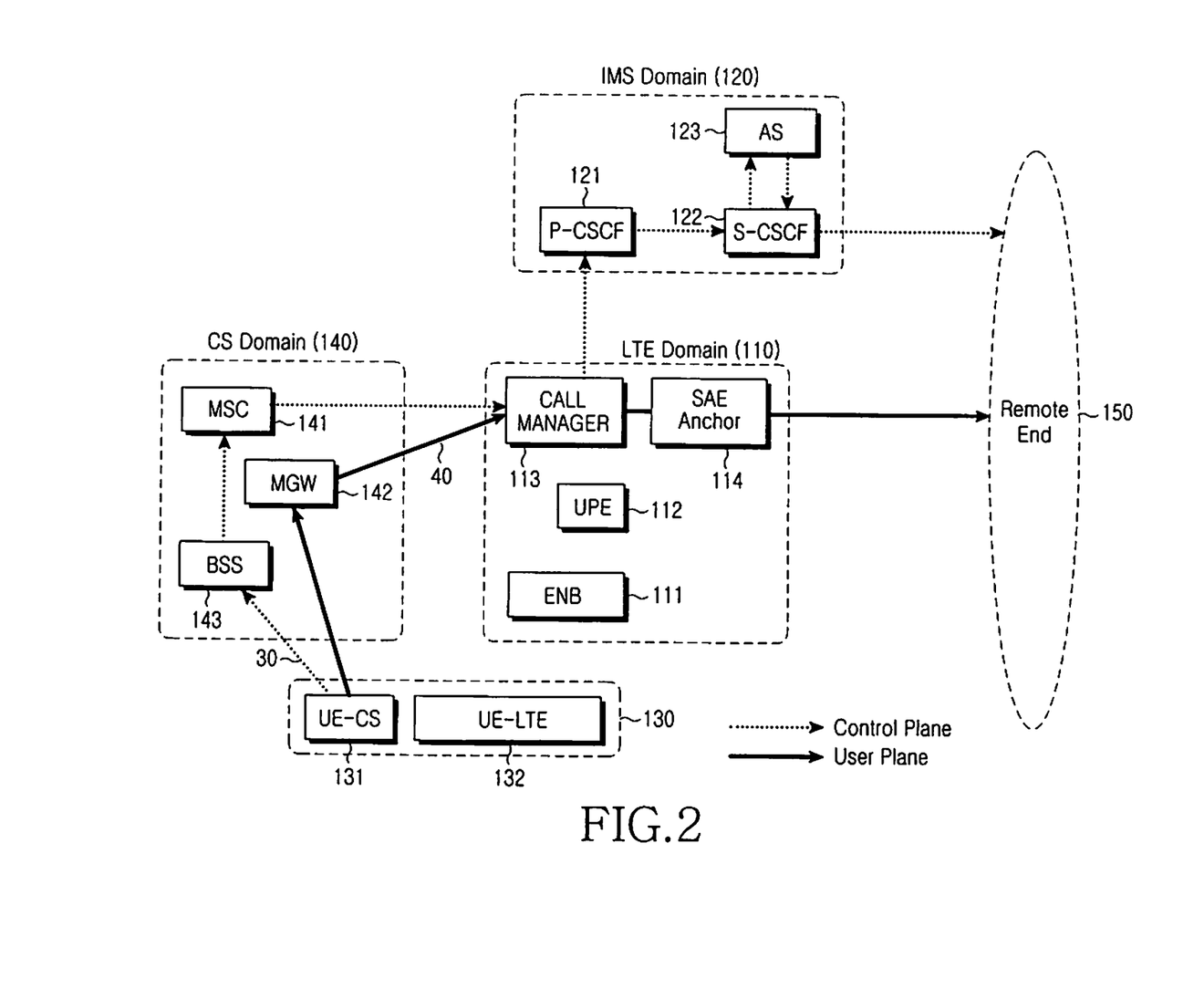
FIG. 2 is a conceptual diagram illustrating a combined configuration of an LTE/SAE system and nodes necessary for a case where a voice call is connected in a CS system.

FIG. 1 is a conceptual diagram illustrating a combined configuration of a CS system and nodes necessary for a case where a voice call is connected in an LTE/SAE system, and FIG. 2 is a conceptual diagram illustrating a combined configuration of an LTE/SAE system and nodes necessary for the case where a voice call is connected in a CS system.

Referring to FIGS. 1 and 2, the combined configuration roughly includes an LTE/SAE domain 110, an IMS domain 120, a CS domain 140, a calling terminal (transmitting terminal) 130, and another terminal (called terminal or remote end), i.e., a receiver 150, for making communication with the calling terminal 130. A brief description will now be made of nodes of each domain. It is assumed that the calling terminal 130 has both a UE-CS function 131 for making access to a CS system and a UE-LTE/SAE function 132 for making access to an LTE/SAE system.

The LTE/SAE domain 110 includes a base station 111, or Enhanced Node B (ENB), for making communication with the terminal 130 over a radio channel, and since LTE/SAE basically provides all data in the IP packet form or the packet form, IP packet data or packet data is transmitted between the ENB 111 and the terminal 130. Both the IP packet data and the packet data will be referred to herein as a 'packet'. The ENB 111 is connected to a User Plane Entity (UPE) 112 located in an upper layer of the ENB 11, and the UPE 112 is connected to a System Architecture Evolution (SAE) Anchor 114. Therefore, the user data transmitted by the calling terminal 130 is transmitted to the receiver 150 located in the remote place via the ENB 111, the UPE 112, and the SAE Anchor 114.

The calling terminal 130, while communicating over the LTE/SAE domain 110 in the manner described above, transmits packet data and a control signal for a call is delivered to the IMS domain 120. The packet data is herein assumed to be a voice call data transmitted via VoIP. In this case, regarding a flow of a control signal for a VoIP call, a control signal of the calling terminal 130 is delivered to the IMS domain 120 via the ENB 111, a call manager 113, and the SAE Anchor 114. Thereafter, the control signal for a VoIP call is transferred to an Application Server (AS) 123 via Call Session Control Functions (CSCFs) 121 and 122 of the IMS domain 120. Therefore, the VoIP call control signal, under the control of the AS 123, is provided to the receiver 150 located in a remote place via the Serving-Call Session Control Function (S-CFCF) 122.

The CS domain 140, as is well known, includes a Mobile Switching Center (MSC) 141, a Media Gateway (MGW) 142, and a Base Station Subsystem (BSS) 143.

Communication achieved through an LTE/SAE system with the foregoing structure, when a voice call is set up in the calling terminal 130, is described below.

The IMS domain 120 provides communication services over a non-fixed path using IP packets, and a VoIP voice message based on the IMS domain 120 is transmitted through an IMS session. Therefore, the AS 123 performs anchoring on both a CS call and a VoIP call, which occur in a CS network and an LTE/SAE network, respectively. The CS call is delivered to the IMS domain 120 after undergoing a Customized Application of Mobile Enhanced Logic (CAMEL) process in the MSC 141. A detailed description thereof will be given below.

The IMS domain 120 provides IP packet-based services over a non-fixed path, and a VoIP voice message based on the IMS domain 120 is transmitted through an IMS session. The AS 123 performs anchoring on both a CS call and a VoIP call, which occur in the CS network and the LTE/SAE network, respectively. The MSC 141 supporting the CS call service acquires address information for routing from the CS domain 140 to the IMS domain 120 through a CAMEL process; and based on the address information, the MSC 141 delivers an Integrated Services digital network User Part Initial Address Message (ISUP IAM) message to a Media Gateway Control Function (MGCF) (not shown) of the IMS domain 120. The ISUP IAM message delivered to the MGCF is delivered to the AS 123 via the S-CSCF 122 after being converted into a Session Initiation Protocol (SIP) INVITE request. Upon receiving the SIP INVITE request, the AS 123 delivers an SIP INVITE request to a called party after performing anchoring on the corresponding CS call.

When the calling terminal 130 issues a request for a VoIP call over an IMS network, an SIP INVITE request is provided to the Proxy-Call Session Control Function (P-CSCF) 121 which is the first IMS entry entity connecting the IMS network to a General Packet Radio Service (GPRS) network. Then the P-SCSF 121 forwards the SIP INVITE request to the AS 123 via the S-CSCF 122 for providing a particular service to a user based on subscriber information of the user. The S-CSCF 122 takes charge of authentication and service subscription information management for providing a particular service to a user, call control, etc. Similarly to the CS call, the AS 123 performs anchoring on the corresponding VoIP call and then delivers an SIP INVITE request to the called party. As described above, both the CS call and the LTE/SAE VoIP call are controlled by the AS 123 of the IMS domain 120.

FIGS. 1 and 2 show a VoIP call and a CS call, which both undergo anchoring by the AS 123. A control signal 20 for a VoIP call is transmitted by the UE-LTE/SAE function 132 and then delivered to the IMS domain 120 via the LTE/SAE domain 110. Thereafter, the control signal 20 for a VoIP call is delivered to the receiver 150 via the S-CSCF 122 after undergoing anchoring to the AS 123 via the P-CSCF 121 and the S-CSCF 122 of the IMS domain 120. At this point, voice data 10 is delivered to the SAE Anchor 114 via the ENB 111 and the UPE 112, and then delivered to the receiver 150 over an IP network.

A control signal 30 for a CS call is delivered from the UE-CS function 131 to the S-CSCF 122 via the MSC 141, and a Mobility Management Entity (MME) and an MGCF function (both not shown and described below) of the call manager 113, and the S-CSCF 122 sends this signal to the AS 123, performing anchoring. Thereafter, the AS 123 sends a call control signal to the receiver 150, completing the call. At this point, voice data 40 is delivered to the SAE Anchor 114 via the MGW 142 of the CS domain 140 and the call manager 113, and then delivered to the receiver 150 over the IP network.

As assumed above, presently, the terminal 130 can use both the CS system and the LTE/SAE system. However, the terminal 130 has a limitation in simultaneously accessing the two types of networks: the CS system and the LTE/SAE system, i.e., the terminal 130 cannot access the CS system while in communication with the LTE/SAE system, and cannot access the LTE/SAE system while in communication with the CS system. This is because the terminal 130 has only one radio processor, and therefore the terminal 130 can use only one radio channel.

When simultaneous access to the CS system and the LTE/SAE system is unavailable in this way, it is not possible to support handover between the VoIP call and the CS call. A description will now be given of an occurrence of problems where handover between the VoIP call and the CS call cannot be supported.

A Voice Call Continuity (VCC) technology has been proposed by 3GPP TS23.206 as a technology for supporting handover between a VoIP call and a CS call. However, in TS23.206, both of the calls, as described above, undergo anchoring in a VCC Application, which is an IMS AS 123. In TS23.206, however, the terminal is assumed to be a Dual Radio terminal that can make simultaneous access to the CS system and a Packet Switching (PS) system. Therefore, for example, when the terminal intends to perform a handover to a VoIP call of the IMS network, over the PS system, while maintaining the existing CS call over the CS system, the terminal uses a method of generating a new session through the IMS network using a radio channel allocated for an access to the PS system, and then, if the generation of the new session is completed, releasing the existing CS call being continued through the existing CS system. Therefore, if the terminal cannot simultaneously access to different networks of the CS system and the PS system as assumed herein, the terminal cannot apply the VCC solution based on Dual Radio defined in 3GPP TS23.206. Accordingly, there is a need for a method for supporting handover to the LTE/SAE system when the Single Radio-based terminal needs the handover while receiving the CS call.

Figure 3A:
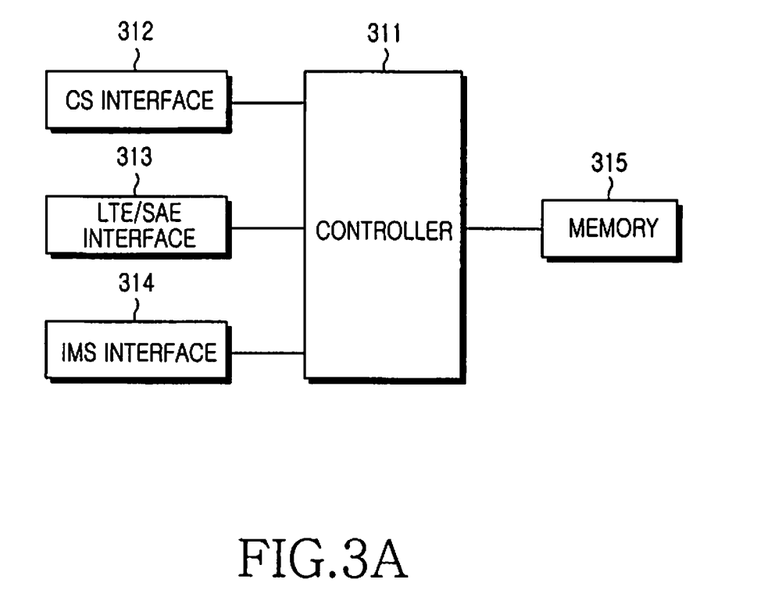
FIG. 3A is a block diagram illustrating a structure of a call manager according to a preferred embodiment of the present invention.
Figure 3B:
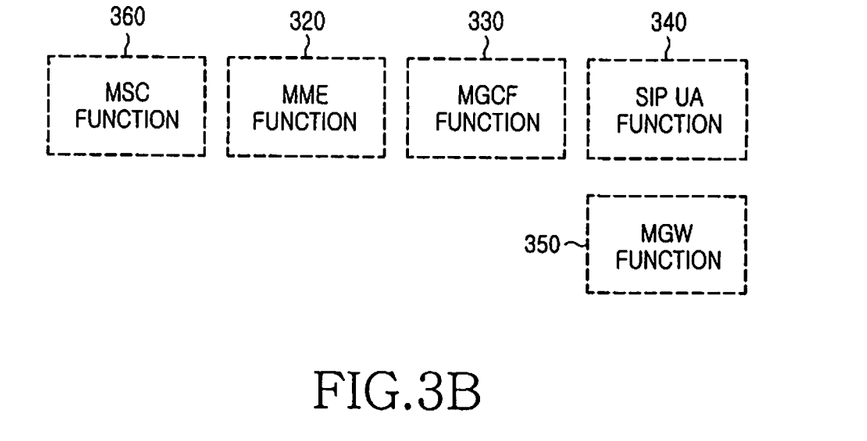
FIG. 3B is a function diagram of a call manager according to a preferred embodiment of the present invention.

FIG. 3A is a block diagram illustrating a structure of a call manager according to a preferred embodiment of the present invention, and FIG. 3B is a function diagram of a call manager according to a preferred embodiment of the present invention. With reference to FIGS. 3A and 3B, a description will now be made of an operation of a call manager and each function thereof.

A call manager 113 according to the present invention can exchange control signals and user data with a CS domain 140, an IMS domain 120, and an LTE/SAE domain 110. Therefore, the call manager 113 includes a CS interface 312 for interfacing with nodes of the CS domain 140, an LTE/SAE interface 313 for interfacing with nodes of the LTE/SAE domain 110, and an IMS interface 314 for interfacing with nodes of the IMS domain 120. Further, the call manager 113 has a controller 311 for processing signals received from the interfaces 312, 313, and 314. The controller 311 receives user data and/or control signals from a specific domain through a particular interface, and provides the received user data and/or control signals to the same domain or different domains. For such a process, the controller 311 includes a routing function, a switching function, a message conversion function, etc. A description of such actual functions will be given with reference to the function diagram of FIG. 3B. In addition, the call manager 113 includes a memory 315. The memory 315 has an area for storing control information for processing each function, an area for storing data generated during the control operation, an area for storing information on the terminal, and an area for storing various data.

The call manager 113 has, for example, five functions. An MSC function 360 is a function of exchanging information with an MSC 141 of the CS domain 140, for Single Radio Session Continuity (SRSC). Therefore, the MSC function 360 can be used for performing inter-MSC handover. An MME function 320 is a function of performing management on mobility of the terminal. An MGCF function 330 serves as a gateway function for converting an ISUP message into an SIP message, like the MGCF function (not shown) in the IMS domain 120.

An SIP User Agent (UA) function 340, which corresponds to a terminal apparatus in an SIP network, serves as an SIP UA function to process SIP signaling for SRSC. Finally, the call manager 113 includes an MGW function 350, and the MGW function 350 serves as an MGW function for converting the voice data and service data, which are formed into a packet in the user plane, into a format appropriate for the CS network, or inversely converting data from the CS network into packet data.

A detailed description will now be made of an operation in each of the functions. The call manager having the foregoing structure performs the following operation.

The present invention provides an apparatus called a call manager, to provide a process of handing over an LTE VoIP call to a Global System for Mobile communications (GSM)/Wideband Code Division Multiple Access (WCDMA) CS call, and also provides a procedure therefor. The call manager supports a fast handover process with a target MSC when handover between an LTE VoIP call and a GSM/WCDMA CS call occurs. In addition, when performing handover from the LTE VoIP call to the GSM/WCDMA CS call, the call manager performs a function of converting the existing VoIP session call data into a CS network's call signal, and converting voice and multimedia packet data into CS data for the CS network, i.e., if movement of the terminal is completed after the old session is replaced with a new session so that the existing VoIP call is not disconnected when the terminal undergoes handover to the CS network, the call manager serves to connect the replaced session to a newly established CS line, and convert the voice packet data for the LTE VoIP call and the CS voice data into each other on a mutual basis, before delivery. Therefore, when a dropped call is expected in the handover process to the CS network, it is also possible to transmit call interruption announcement along with the LTE VoIP call. A description will now be made of a function-switching of an integrated call manager according to the present invention, a control process based thereon, and a signal flow for handover between other nodes.

Figure 4A:
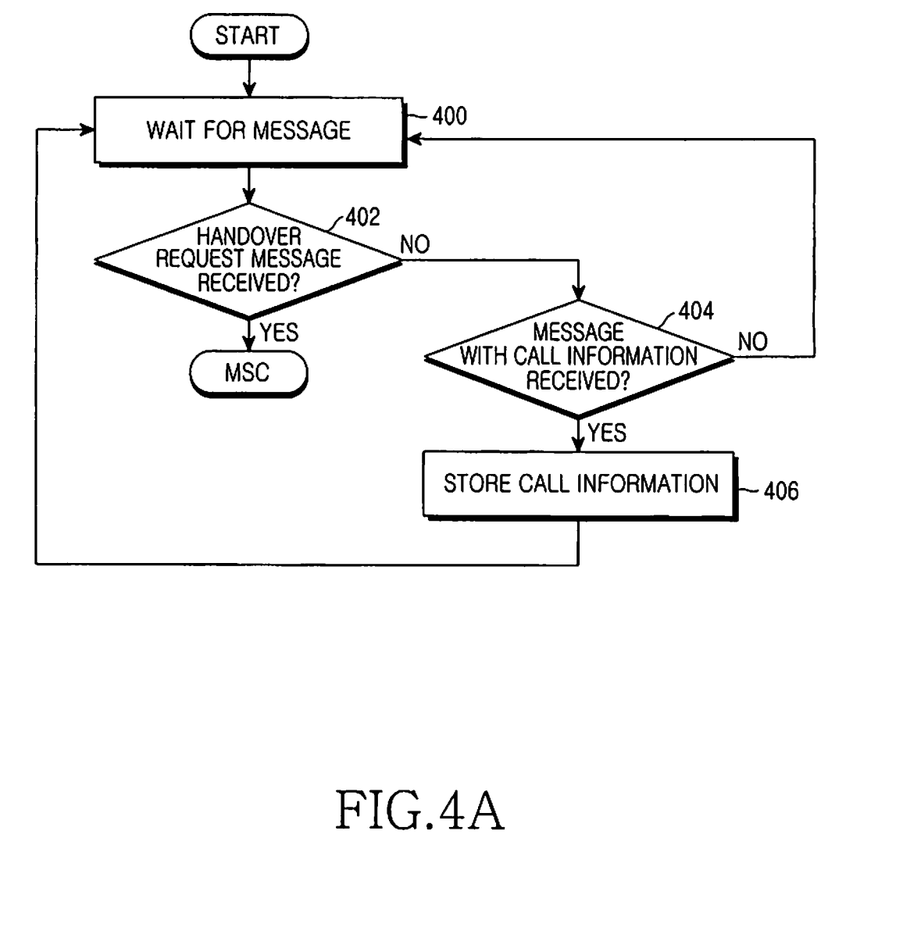
FIGS. 4A to 4C are flowcharts illustrating an operation of a call manager during a handover from an LTE VoIP call to a GSM/WCDMA CS call according to an embodiment of the present invention.
Figure 4B:
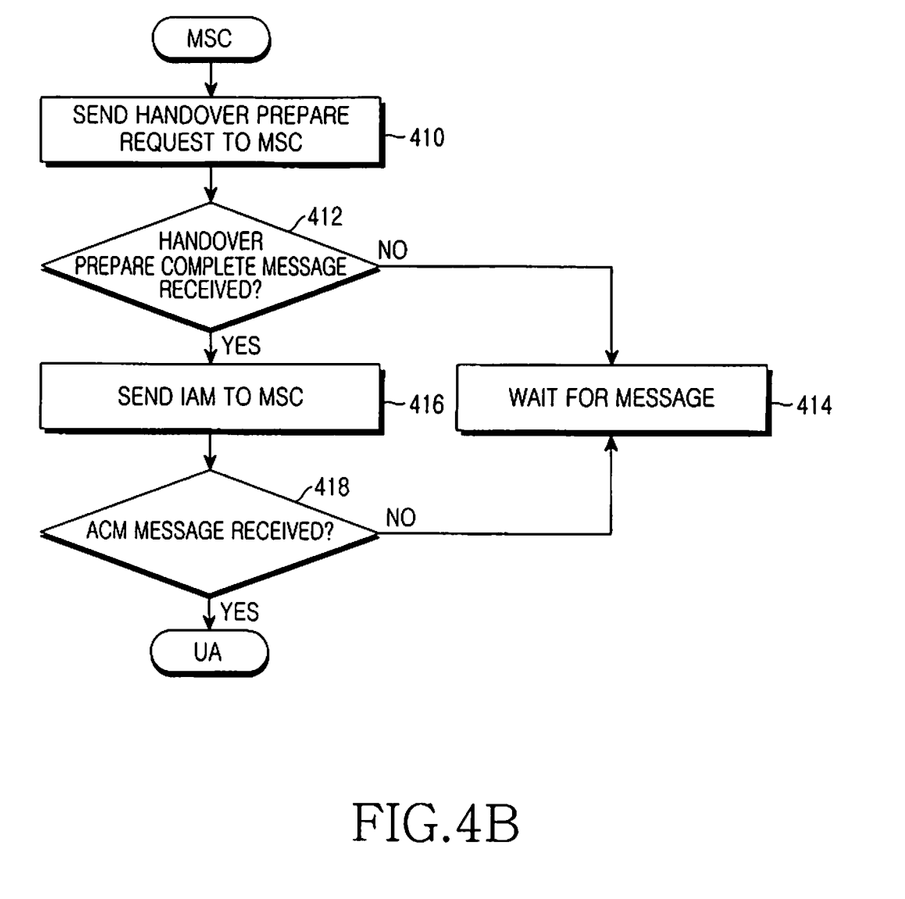
Figure 4C:
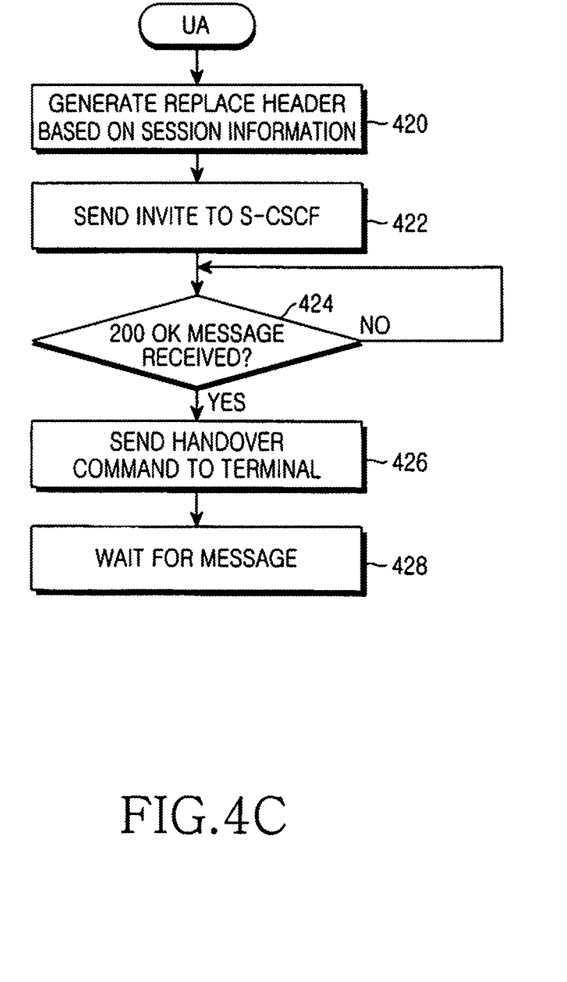

FIGS. 4A to 4C are flowcharts illustrating an operation of a call manager during handover from an LTE VoIP call to a GSM/WCDMA CS call according to an embodiment of the present invention.

The call manager is herein assumed to perform its operation with an MME function 320. Therefore, in a message waiting state of step 400, the call manager operates with the MME function 320. The call manager waits to receive a message in step 400. Upon receiving a particular message, the call manager determines in step 402 whether the received message is a handover request message received from an ENB. If it is determined in step 402 that the received message is a handover request message, the call manager switches to an MSC function 360, and sends a handover prepare request to an MSC to prepare for fast handover. A detailed description of the MSC function will be made with reference to FIG. 4B.

However, upon a failure to receive the handover request message, the call manager determines in step 404 whether it has received a message with SIP call information for the ongoing call from an AS 123. If it is determined in step 404 that it has received a message with call information, the call manager stores the call information in step 406, and then keeps the MME function 320 in step 400. However, if it is determined in step 404 that it has failed to receive the message with call information, the call manager continues to keep the MME function 320 in step 400.

Referring to FIG. 4B, the call manager, which has switched to the MSC function 360, sends a handover prepare request to an MSC 141 in step 410. Thereafter, the call manager waits for a handover prepare complete message from the MSC 141 for a time T0. The call manager determines in step 412 whether a handover prepare complete message has been received from the MSC 141 within the time T0. If the handover prepare complete message has been received, the call manager proceeds to step 416. Otherwise, the call manager proceeds to step 414 where the call manager maintains the message waiting state. Herein, the message waiting state is the same MME function 320 as step 400 of FIG. 4A.

Upon receiving the handover prepare complete message from the MSC 141, the call manager establishes a new line by sending an IAM message to the MSC 141 in step 416. After sending the IAM message to the MSC 141, the call manager determines in step 418 whether an Address Complete Message (ACM) message is received, waiting for the ACM message from the MSC 141 for a time T1. Upon receiving the ACM message, the call manager switches to an SIP UA function 340. However, upon a failure to receive the ACM message, the call manager switches to the MME function 320 in step 414.

After switching to the SIP UA function 340, the call manager generates, in step 420, a replace header based on the session information received in step 404. In step 422, the call manager transmits the generated replace header to an S-CSCF 122 together with an INVITE request. Thereafter, the call manager determines, in step 424, whether a 200 OK message is received from the S-CSCF 122 within a time T2. If it is determined in step 424 that the 200 OK message is received, the call manager switches to a second MSC function in step 426. With the second MSC function, the call manager sends a handover command to a terminal in step 426. Thereafter, the call manager switches to the MME function 320 in step 428. However, if it is determined in step 424 that the call manager has failed to receive the 200 OK message, the call manager switches to the MME function 320. A failure to receive the 200 OK message in step 424 corresponds to a failure in call switching. Therefore, the switching to the MME function 320 is a return to the message waiting state after stopping the handover operation. A recovery process is omitted in the drawing. When the INVITE request for call switching fails, the recovery operation does not pertain to the present invention, so a detailed description thereof is omitted.

Figure 5:
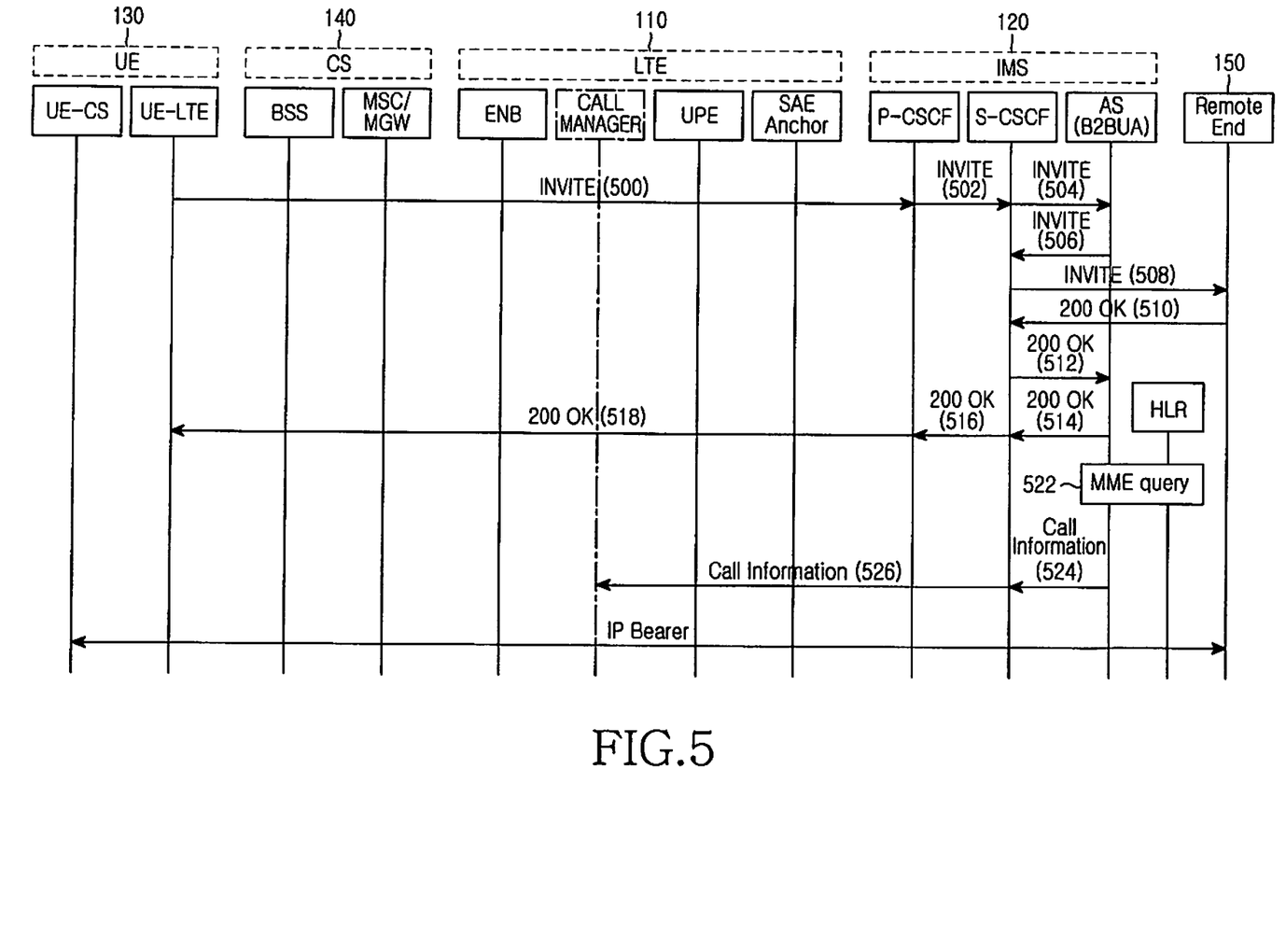
FIG. 5 is a signaling diagram in which a terminal establishes a VoIP call through an LTE network according to an embodiment of the present invention.

FIG. 5 is a signaling diagram in which a terminal establishes a VoIP call through an LTE network according to an embodiment of the present invention.

A terminal in FIG. 5 generates an LTE VoIP call using the same scheme as existing VCC technology. However, the present invention proposes a scheme in which a call manager temporarily serving as an SIP UA/MGW takes charge of receiving an LTE VoIP call on behalf of the terminal while the terminal performs handover to the CS network, in order to support the handover from the LTE VoIP call to the CS call of the terminal capable of receiving only the Single Radio-based signal. For the handover, the call manager serving as an SIP UA/MGW requires call information for the VoIP call now in service to the terminal. The following detailed description of FIG. 5 describes a method for delivering information on the call now in service to the terminal to the call manager.

Nodes in FIG. 5 are equal in structure to the nodes described in FIGS. 1 and 2 except for the integrated call manager according to the present invention. The LTE VoIP call is always anchored in an AS 123, and the AS 123 serves as a Back-to-Back UA (B2BUA) SIP AS (an SIP entity for internally connecting an SIP call connected to each UA on a mutual basis, as two UAs operate in one entity) for all LTE VoIP calls. However, when supporting only the handover from the LTE network to the CS network, the AS 123 can also operate as a proxy AS that only relays the call signal, rather than operating as the B2BUA SIP AS.

In step 500, a terminal 130 sends an INVITE request to a P-CSCF 121 to establish a VoIP session. In step 502, upon receiving the INVITE request, the P-CSCF 121 forwards the INVITE request to an S-CSCF 122. In step 504, the S-CSCF 122 forwards the INVITE request to an AS 123 according to an initial Filter Criteria (iFC). Upon receiving the INVITE request, the AS 123 stores information on an originating call, generates a new INVITE message to be delivered to a receiver 150 based on the received INVITE message, and delivers the generated new INVITE message to the receiver 150 in step 506, i.e., the AS 123 operates as a B2BUA SIP AS, i.e., this INVITE is delivered to the S-CSCF 122 in step 506, and in step 508, the S-CSCF 122 forwards the INVITE to the receiver 150 or a called-party network. When considering only the handover from the LTE network to the CS network, the AS 123 can perform an operation of only the proxy AS that simply relays only the call signal, rather than operating as a B2BUA AS. Upon receiving of INVITE, the receiver 150 sends a 200 OK message in response thereto in step 510. For convenience, a description of a Provisioning Response message and a Resource Reservation message will be omitted herein, which can be exchanged between the AS 123 and the receiver 150 before receiving of the 200 OK message. The 200 OK message is forwarded to the AS 123 in step 512, and the AS 123 forwards the 200 OK message to the S-CSCF 122 in step 514 in order to send it to the calling terminal 130. In step 516, the S-CSCF 122 forwards the 200 OK message to the P-CSCF 121, and finally, the 200 OK message is forwarded to the calling terminal 130 in step 518. The operation of the B2BUA AS is performed in the same way even when the terminal receives the INVITE request.

In a process of step 522, the AS 123 determines an address of the call manager in order to deliver the generated session information to an SIP UA function 340 of the call manager. The AS 123 sends a query to Home Location Register (HLR)/Home Subscriber Server (HSS) using a Uniform Resource Identifier (URI) of the terminal in order to determine an address of the call manager that currently services the terminal. Herein, the HLR/HSS corresponds to the network entity in which the address of the call manager is stored in the process where the terminal accesses the LTE network. The address of the call manager can be stored as an address indicating a call manager functional entity of the call manager, or can be stored as an address indicating an MSC function 360 of the call manager. These addresses can be expressed in various forms such as SIP URI, IP Address, and Mobile Station Integrated Services Digital Network (MSISDN).

In step 524, the AS 123 delivers session information to the SIP UA function 340 of the call manager using the call manager's address obtained in step 522. The session information is call information from the AS 123 to the receiver 150, and when there is no call anchored in the AS 123, the session information indicates call information from the terminal 130 to the receiver 150. In step 526, when the call manager's address is an SIP URI or IP address, the session information is delivered to the SIP UA function 340 of the call manager via the S-CSCF 122 using the address information. When the call manager's address is an MSISDN address, the S-CSCF 122 delivers the MSISDN address to the call manager after converting the address into an SIP URI address through a Telephone Number Mapping (ENUM) query. In this case, the session information can be delivered using an SIP MESSAGE method or a message of another type, and it is assumed herein that there is no limitation on the type of the message delivering the session information. However, the contents included in the session information include the information that the call manager, as the call manager operates as the SIP UA function 340, requires for generating an INVITE message including media information such as replace header and codec to the called party, including Call-IDentification (ID), from-tag and to-tag information of the currently established session. This information is used in the process of replacing the existing session directly generated between the calling party and the called party with a new session between the SIP UA function 340 of the call manager and the receiver 150 while handover occurs. Thereafter, the call signal of the new LTE VoIP session, generated between the call manager and the receiver 150 and the CS call signal that the terminal has generated in the CS network, are converted into each other by the call manager.

Figure 6A:
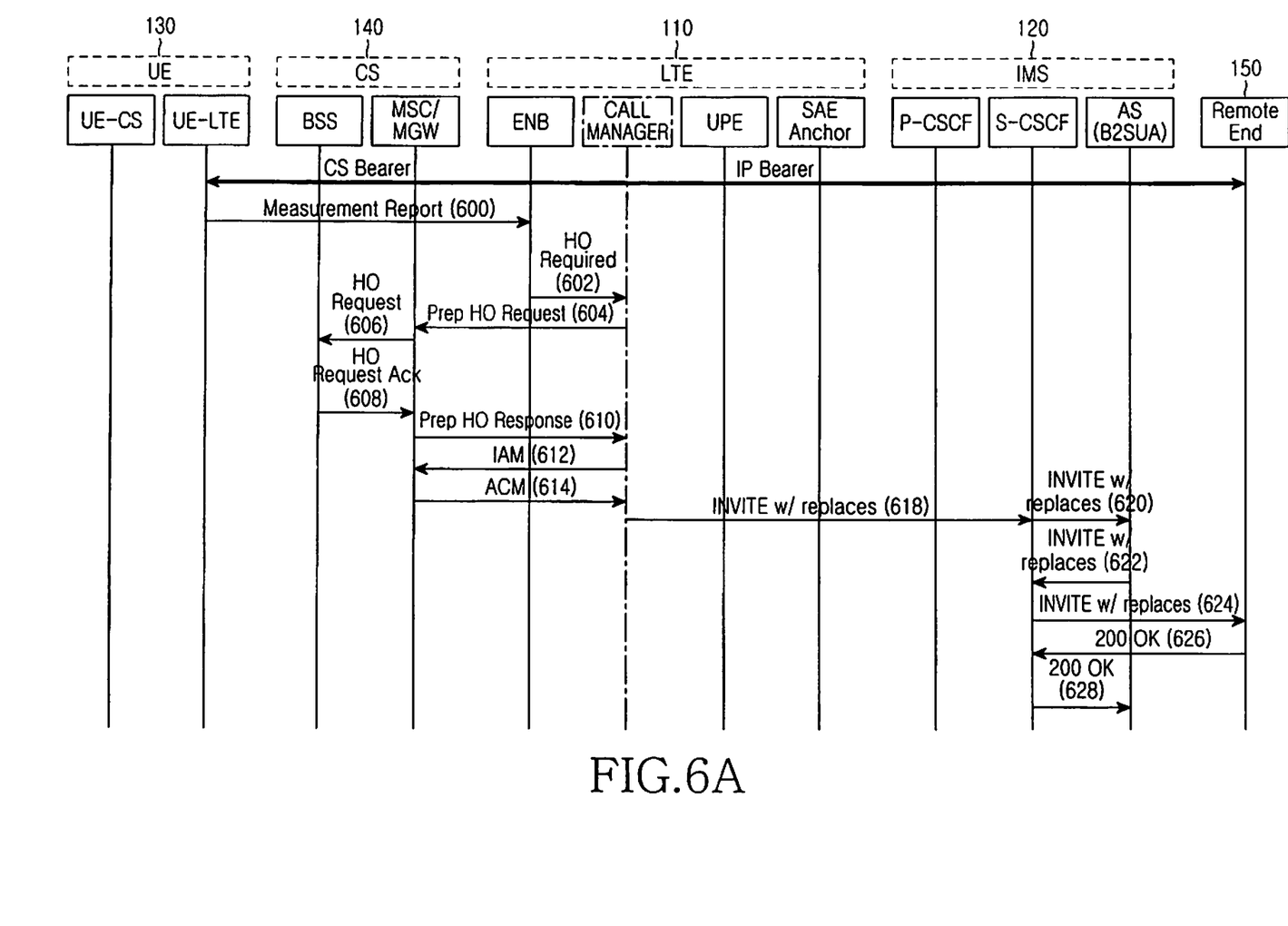
FIGS. 6A and 6B are signaling diagrams in which a handover from an LTE VoIP call to a GSM/WCDMA CS call is performed by a call manager according to an embodiment of the present invention.
Figure 6B:
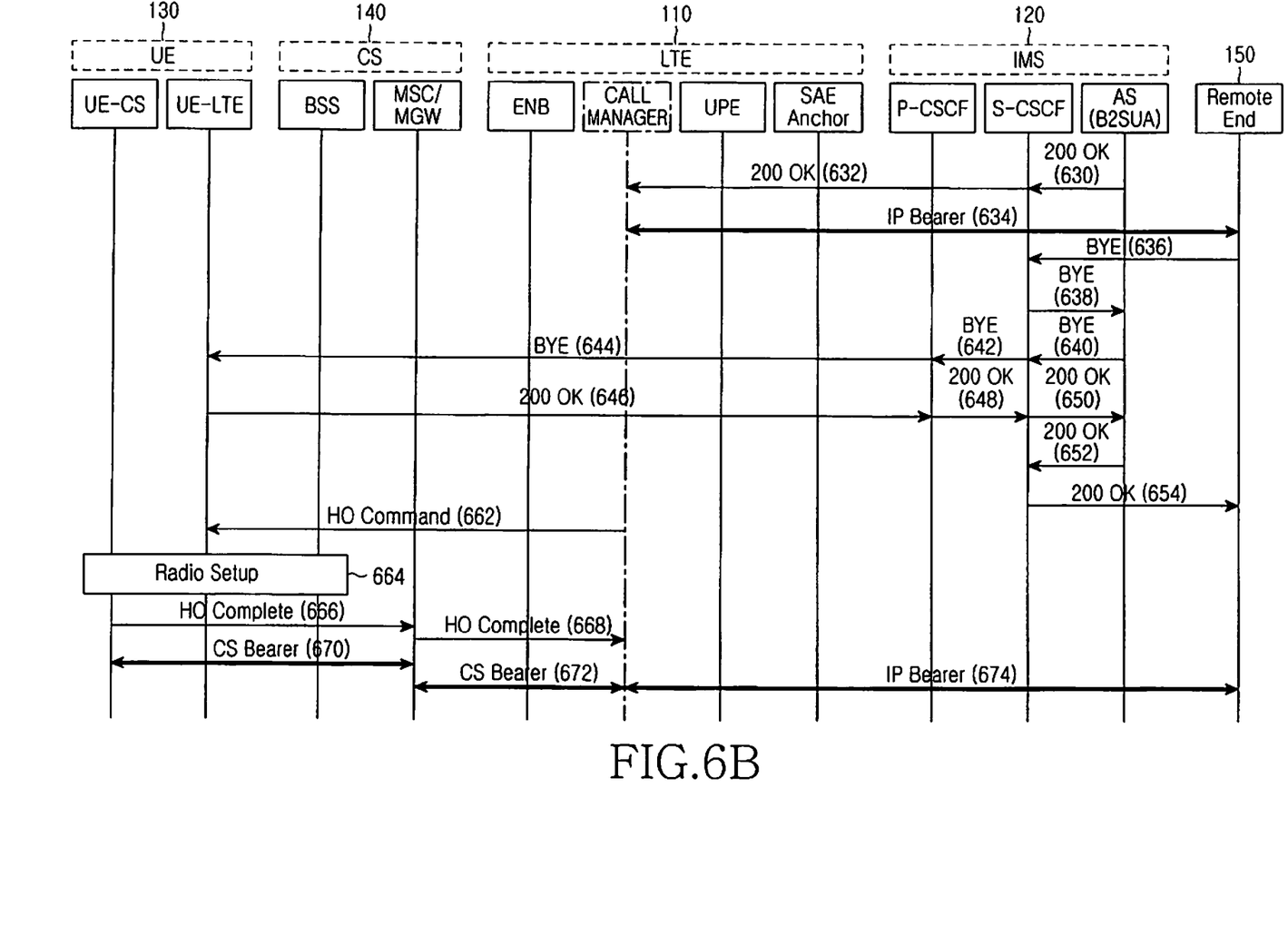

FIGS. 6A and 6B are signaling diagrams in which handover from an LTE VoIP call to a GSM/WCDMA CS call is performed by a call manager according to an embodiment of the present invention. It is assumed in this situation that the terminal is performing an LTE VoIP call with a called party.

According to the present invention, a call manager serving as an SIP UA maintains a voice call with a called party (Remote-End) on behalf of the terminal in the process where Handover Preparation occurs between a call manager serving as an MSC and an MSC located in a CS network, using information on the call now in service, acquired by the call manager through the process described in FIG. 5. A detailed description thereof will be given below with reference to FIG. 6A.

In step 600, a terminal 130 periodically transmits information on the current radio status to an access network such as an ENB 111. In step 602, the ENB 111 monitors the radio status of the terminal based on the measurement information provided from the terminal 130. During the monitoring, upon receiving measurement information indicating that the current radio status of the terminal 130 is poor and the radio status of an adjacent cell is good, the ENB 111 determines that there is a need for handover on the corresponding terminal 130. If it is determined that there is a need for handover, the ENB 111 sends a handover request message to a call manager in step 602. The handover request message may include the following fields. The following exemplary fields are given for convenience of description, and names of and the number of the fields are subject to change according to the system: Message Type, Cause Value, Measured Cell Identifier List, Current channel type, Mobility-related Context, and Security-related Context Information for Terminal.

In step 604, upon receiving the handover request message from the ENB 11, the call manager sends a handover prepare request to a handover-target MSC for fast handover. In this case, the call manager transmits, to the MSC, the information that the target radio network needs for allocating resources for the terminal 130. The handover prepare request message may include the following fields: Handover-Target Cell Id, International Mobile Subscriber Identity (IMSI) of Terminal, and Security information.

In step 606, upon receiving the handover prepare request, the MSC sends a bearer establishment request message to the target radio network. This message includes the information based on which the target radio network allocates resources for the terminal 130. The bearer establishment request message may include the following fields: Message Type, Channel Type, Cause Value, Security Information, IMSI of Terminal, Target Cell's ID, and Information for Resource Allocation in BSS.

In step 608, upon receiving the bearer establishment request message, the radio network allocates the requested resources. After completing the resource allocation, the BSS sends a bearer establishment complete message to the MSC.

The bearer establishment complete message may include the following fields: Message Type, Established Channel Information, and Established Security Information.

In step 610, upon receiving the bearer establishment complete message, the MSC assigns a handover number, and then sends a handover prepare complete message to the call manager. The handover prepare complete message includes an assigned handover number field and a radio resource information field.

In step 612, the call manager sends an ISUP IAM message including a User Service Information (USI) parameter, which is information on a called party number, a calling party number and a service type, to the MSC in order to establish a line to the MSC. In step 614, the MSC sends an ISUP ACM message to the call manager in response thereto. After completing the line establishment to the MSC, the call manager sends, in step 618, an INVITE request to the S-CSCF 122 in order to switch the VoIP session now ongoing between the terminal 130 and the called party to the session between the MGCF/MGW of the call manager and the called party. This INVITE request includes a replace header, and the INVITE request and the contents of the replace header included in the INVITE request are generated using the session information provided from the AS 123 when the ongoing VoIP session is generated. The INVITE request is forwarded to the AS 123 in step 620, and the AS 123 forwards the INVITE request to the receiver 150 via the S-CSCF 122 in steps 622 and 624. When the handover from the CS network to the LTE network is not considered, the INVITE request can be directly forwarded to the called party network via the S-CSCF 122, rather than being forwarded to the AS 123 in step 620.

In step 626, the receiver 150 sends a 200 OK message to the S-CSCF 122 in response to the INVITE request. The 200 OK message is forwarded to the AS 123 in step 628, and forwarded again to the call manager via the S-CSCF 122 in steps 630 and 632. After this process is completed, the existing VoIP session is switched to a new session, which is connected to the receiver 150 from the MGCF/MGW of the call manager via an SAE Anchor 114. Through this process, an IP bearer between the call manager and the receiver 150 is established in step 634.

Thereafter, in step 636, the receiver 150, since it has received the INVITE request with a replace header, sends a BYE message to the S-CSCF 122 in order to release the existing session. This BYE message is forwarded to the AS 123 in step 638, and forwarded again to the S-CSCF 122 by the AS 123 in step 640. The S-CSCF 122 forwards the BYE message to the P-CSCF 121 in step 642, and the BYE message is finally forwarded to the calling terminal 130 in step 644. In response to the BYE message, the calling terminal 130 sends a 200 OK message to the P-CSCF 121 in step 646. The 200 OK message is forwarded to the AS 123 via the S-CSCF 122 in steps 648 and 650, and forwarded again to the receiver 150 via the S-CSCF 122 in steps 652 and 654. When the 200 OK message is forwarded to the receiver 150, the existing VoIP session is released.

In steps 638 through 654, the responses of the calling terminal 130 can be omitted in order to reduce the delay time occurring during handover. In this case, the response to the BYE message can be processed by the network.

In step 662, the call manager forwards a handover command to the terminal 130 so that the terminal 130 can perform handover to the CS network. The handover command includes Message Type, Layer 3 Information, etc. Upon receiving the handover command, the terminal 130 performs, in step 664, a process of switching the LTE radio to the CS radio and then establishing (setting up) a Radio connection by accessing the CS Radio Access Network (RAN). After completing this process, the terminal 130 sends a handover complete message to the MSC via the radio network in step 666, completing the handover. The MSC forwards the handover complete message to the call manager in step 668 so as to release the resources for the call manager's operation in the existing LTE network, and the call manager forwards, in step 672, the voice and multimedia data for the LTE VoIP session, generated in step 618, to the CS network, and similarly, starts to deliver the voice and multimedia data for the CS network to the LTE network in step 674.

As is apparent from the foregoing description, the present invention can provide handover without a dropping a call when simultaneous access to two radio signals from the LTE system and the CS system is not possible. In this manner, it is possible to provide higher-quality services to the users.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handover method between heterogeneous networks, in which a call manager of a network including a Circuit Switching (CS) network supporting a CS call, a Long Term Evolution (LTE) network supporting a packet call, and an Internet Protocol Multimedia Subsystem (IMS) network for anchoring a call, provides handover, from the LTE network to the CS network, to a first terminal that uses one radio channel and can access the CS network and the LTE network, the method comprising:

upon receiving a request for handover to a base station of the CS network from the first terminal via a node of the LTE network, establishing a line to a Mobile Switching Center (MSC) of the CS network;

switching a session between the first terminal and a second terminal in communication with the first terminal to a session between the call manager and the second terminal;

establishing an Internet Protocol (IP) bearer between the call manager and the second terminal;

sending a handover command to the first terminal to establish a radio channel to the base station of the CS network; and upon completing the handover of the first terminal, converting data transmitted through the IP bearer into data of the CS network for providing to the first terminal, and converting data transmitted through the radio channel into data of the LTE network for providing to the second terminal.

2. The handover method of claim 1, wherein receiving the request for the handover comprises:

receiving a handover request message from a base station of the LTE network, and wherein the handover request message comprises fields of Message Type, Cause Value, Measured Cell Identifier List, Current channel type, Mobility-related Context, and Security-related Context for Terminal.

3. The handover method of claim 1, wherein establishing the line comprises:

sending a handover prepare request message to the MSC of the CS network; and receiving, from the MSC of the CS network, a handover prepare complete message.

4. The handover method of claim 3, wherein the handover prepare request message comprises fields of Handover-Target Cell IDentifier (ID), International Mobile Subscriber Identity (IMSI) of Terminal, and Security Information.

5. The handover method of claim 3, wherein the handover prepare complete message comprises an assigned handover number field and a radio resource information field.

6. The handover method of claim 1, wherein switching the session between the first terminal and the second terminal comprises:
receiving, from an Application Server (AS) of the IMS network, information on the session between the first terminal and the second terminal;
generating an INVITE message based on the information on the session between the first terminal and the second terminal; and
sending the INVITE message to a Serving-Call Session Control Function (S-CFCF) of the IMS network.

7. The handover method of claim 1, wherein establishing the radio channel comprises:
sending a handover command message to the first terminal so as to perform handover to the base station of the CS network; and
receiving, from the first terminal, a handover complete message indicating completion of the handover to the CS network.

8. The handover method of claim 7, wherein the handover command message comprises fields of Message Type and Layer 3 Information.

9. The handover method of claim 1, wherein the session between the call manager and the second terminal is maintained until a handover process of the first terminal is completed.

10. A call manager for providing handover from a Long Term Evolution (LTE) network to a Circuit Switching (CS) network by a first terminal in a network including the first terminal that uses one radio channel and can access the CS network and the LTE network, the CS network supporting a CS call, the LTE network supporting a packet call, and an Internet Protocol Multimedia Subsystem (IMS) network for anchoring a call, the call manager comprising:
a first interface for exchanging data and a first control signal with the CS network;
a second interface for exchanging data and a second control signal with the LTE network;
a third interface for exchanging data and a third control signal with the IMS network; and
a controller adapted to establish a line to a Mobile Switching Center (MSC) of the CS network through the first interface upon receiving a request for handover to a base station of the CS network from the first terminal through the second interface, adapted to switch a session between the first terminal and a second terminal in communication with the first terminal to a session between the call manager and the second terminal through the second interface, adapted to establish an Internet Protocol (IP) bearer between the call manager and the second terminal, adapted to send a handover command message to the first terminal to establish a radio channel to the base station of the CS network, through the first interface, adapted to, upon completing the handover of the first terminal, convert data transmitted through the IP bearer into data of the CS network for providing to the first terminal, and convert data transmitted through the radio channel into data of the LTE network for providing to the second terminal.

11. The call manager of claim 10, wherein the controller receives the request for the handover by receiving a handover request message from a base station of the LTE network, and
wherein the handover request message comprises fields of Message Type, Cause Value, Measured Cell Identifier List, Current channel type, Mobility-related Context, and Security-related Context for Terminal.

12. The call manager of claim 10, wherein to establish the line to the MSC of the CS network, the controller sends a handover prepare request message to the MSC of the CS network, and receives a handover prepare complete message from the MSC of the CS network.

13. The call manager of claim 12, wherein the handover prepare request message comprises fields of Handover-Target Cell IDentifier (ID), International Mobile Subscriber Identity (IMSI) of Terminal, and Security Information.

14. The call manager of claim 12, wherein the handover prepare complete message comprises an assigned handover number field and a radio resource information field.

15. The call manager of claim 10, wherein the controller receives, from an Application Server (AS) of the IMS network, information on the session between the first terminal and the second terminal, and sends an INVITE message to a Serving-Call Session Control Function (S-CFCF) of the IMS network.

16. The call manager of claim 10, wherein the controller sends a handover command message to the first terminal so as to perform the handover to the base station of the CS network, and receives from the first terminal a handover complete message indicating a completion of the handover to the CS network.

17. The call manager of claim 16, wherein the handover command message comprises fields of Message Type and Layer 3 Information.

18. The call manager of claim 10, wherein the session between the call manager and the second terminal is maintained until a handover process of the first terminal is completed.

* * * * *